United States Patent [19]
Dawson

[11] 3,779,647
[45] Dec. 18, 1973

[54] INTERFEROMETRIC DEVICE FOR INDICATING DISPLACEMENT ALONG ONE DIMENSION DURING MOTION ALONG ANOTHER DIMENSION

[75] Inventor: Juan C. Dawson, Littleton, Colo.
[73] Assignee: The Bendix Corporation, Southfield, Mich.
[22] Filed: Sept. 7, 1971
[21] Appl. No.: 178,237

[52] U.S. Cl............... 356/109, 356/169, 250/237 G
[51] Int. Cl. ............................................ G01b 9/02
[58] Field of Search.................... 356/110, 164, 109; 250/237 G

[56] References Cited
UNITED STATES PATENTS
3,572,937   3/1971   Baldwin ............................. 356/110
3,371,335   2/1968   Seewald ............................. 356/169

Primary Examiner—David Schonberg
Assistant Examiner—Conrad Clark
Attorney—John S. Bell

[57] ABSTRACT

An apparatus for measuring the displacement of a part such as a work performing tool or a measuring probe of a flatness measuring instrument. The apparatus includes means for providing a collimated laser beam that is disposed parallel to and displaced slightly from a predetermined plane of motion. Two identical prisms are placed side by side to intercept different portions of the laser beam. These prisms direct the intercepted portions of the laser beam to intersect and provide an interference pattern comprising a series of adjacent interference planes. An optical grating is attached to a part that is to be moved nominally along the predetermined plane of motion. This grating intercepts the interference planes and provides a Moire fringe output signal that varies in response to any displacement of the part perpendicular to the plane of motion. Electronic apparatus detects and measures this Moire fringe pattern variation and provides an output indicating the magnitude and direction of any perpendicular displacement.

2 Claims, 3 Drawing Figures

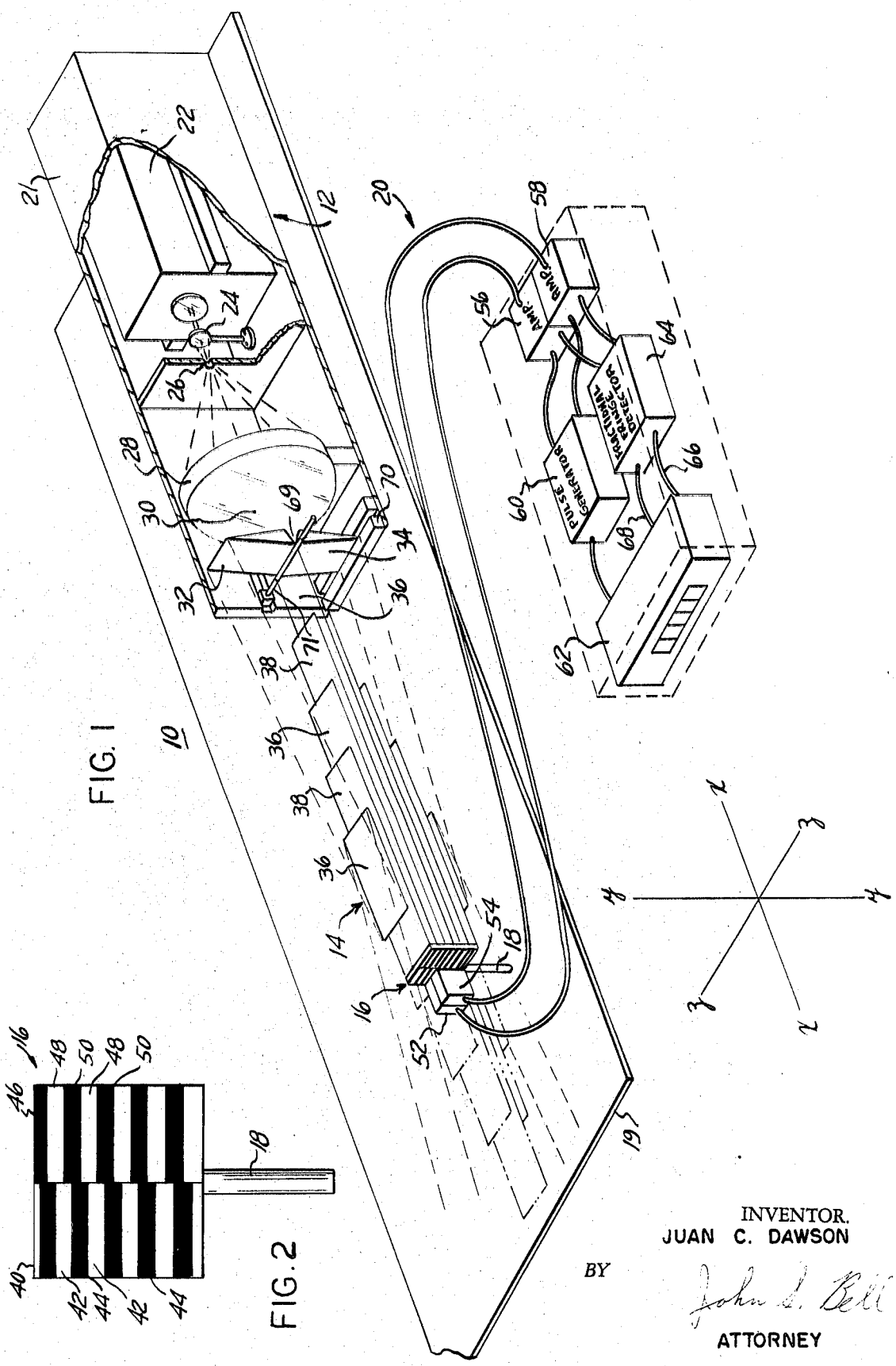

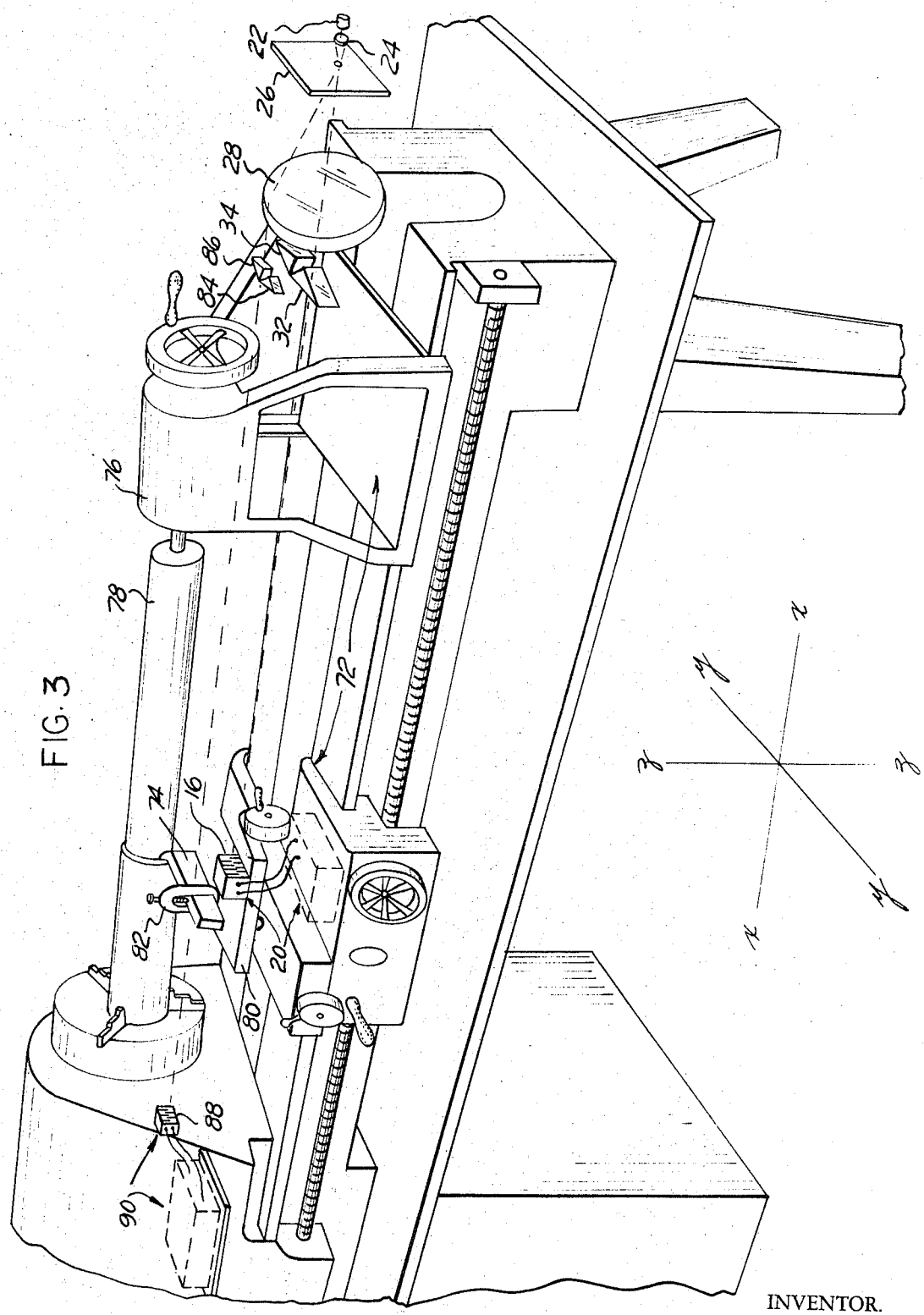

3,779,647

INTERFEROMETRIC DEVICE FOR INDICATING DISPLACEMENT ALONG ONE DIMENSION DURING MOTION ALONG ANOTHER DIMENSION

BACKGROUND OF THE INVENTION

1. Field of the Invention

Position indicating apparatus.

2. Brief Description of the Prior Art

A number of displacement and position measuring devices employing gratings comprising a series of alternate transparent and opaque lines are known. In one such device, a first optical grating is positioned adjacent a second stationary optical grating or adjacent to an image of said second grating, as formed by a lens, and is moved across the surface of that second grating or grating image. The gratings are positioned so that the movable gratings are parallel to the stationary grating or grating image. The movable grating is moved across the stationary grating along a dimension perpendicular to the lines of the gratings. A light is projected onto these gratings, and a Moire fringe pattern is produced as these gratings are moved with respect to each other. The Moire fringe pattern is an optical interference pattern that varies cyclically in response to grating movement. It comprises a shadow pattern of light and dark lines that propagate in a direction perpendicular to the motion of the gratings as the gratings are moved with respect to each other. Photoelectric transducers receive this Moire fringe pattern and convert it to an electric signal that is transmitted to a measuring apparatus that provides an output indicating the magnitude and direction of the relative movement of the gratings perpendicular to the grating lines.

In the above described device, the two optical gratings must be maintained adjacent to each other. If they are separated from each other, light will be diffracted as it passes through one grating and no Moire fringe pattern representing the motion of one grating with respect to the other will be obtained. This device, is, therefore, generally used only in measuring systems in which one grating is attached to a measuring probe, and in which the probe is moved along only one dimension, namely perpendicular to the grating lines. If it is desired to use this device in a system in which a probe moves along two dimensions such as in a flatness measuring system in which a probe is scanned across a test surface and is caused to undergo motion perpendicular to the plane of the test surface by the elevations and depressions existing on that surface, it is necessary to mount the probe, both gratings, the light for illuminating those gratings, and the photo-detectors for sensing the Moire fringe pattern produced by grating movement on a carriage that is moved across the test surface. If completely accurate profile or flatness measurements are desired, either a very precise, accurate, and delicate track mechanism must be provided for the carriage in order to maintain that carriage at precisely the same elevation as it is moved across the surface, or a second measuring system must be provided to measure variations in the elevation of the carriage as it is moved across the surface being measured. Any profile measuring apparatus employing measuring gratings would thus be complex and costly because of this requirement for either apparatus to precisely maintain the carriage at a predetermined elevation, or for apparatus to measure changes in the elevation of the carriage as that carriage is moved across a surface being measured.

SUMMARY OF THE INVENTION

The subject invention comprises an uncomplicated interferometric system for measuring the motion along one dimension of a part such as a measuring probe or a tool as that part or tool is being moved along a second dimension. An interference pattern is provided that extends a predetermined distance along one dimension. The interference pattern comprises an intensity pattern that varies cyclically along a dimension perpendicular to the one dimension. In the preferred embodiments illustrated herein, this interference pattern comprises a series of alternate light and dark interference planes. The interference planes are uniformly spaced, or in other words they have equal thicknesses, and they are disposed perpendicular to the dimension along which measurements are to be made. A grating comprising a series of alternate transparent and opaque parallel lines is placed in the interference field, with the grating lines disposed substantially parallel to the interference planes, to intercept the interference planes and provide a Moire fringe pattern. Variations in the Moire fringe pattern are produced by any relative diaplacement between the grating and the interference pattern along the dimension perpendicular to the interference planes. Variations in the Moire fringe pattern are sensed and measured with electronic measuring apparatus to determine the direction and magnitude of the relative movement. A measurement of positions along the dimension perpendicular to the interference planes can be provided for any location of the grating at which the grating intercepts the planar interference pattern. The apparatus of this invention provides measurements of motion along one dimension, namely, perpendicular to the interference planes during relative motion along a second dimension, namely parallel to the interference planes.

In the embodiments illustrated herein, the planar interference pattern is provided by disposing two identical prisms in a collimated laser beam. These prisms redirect various portions of the laser beam in a manner that causes the redirected portions to interfere and provide a series of alternate, parallel light and dark interference planes. The thickness of the interference planes, or in other words the spacing between those planes, is determined by the shape of the prisms and the relative position of those prisms. The thickness of the interference planes provided by the apparatus of this invention can thus be adjusted over a limited range by adjusting the angle between the two prisms to thereby alter the angles along which the prisms redirect portions of the collimated beam to intersect and interfere. The prisms are disposed to provide the interference planes with a thickness such that measurements made with respect to plane spacing can be readily converted to measurements expressed in conventional measuring units. In addition, the thickness of the interference planes is relatively independent or the orientation of the laser beam with respect to the prisms. That is, the thickness of the interference planes will not be changed by a slight change in the angle at which the laser strikes the prisms. Because of this, the preliminary orientation and adjustments that must be made before the apparatus of this invention can be used to make additional measurements is minimized.

The grating illustrated herein comprises a two-stage grating, with each stage comprising a series of alternate, transparent, and opaque parallel lines. The lines of one stage are adjacent and parallel to the lines of the other. Each series of lines produces a separate Moire fringe pattern. The lines of the grating stages are offset from each other by an amount that will cause the phase of the Moire fringe signal produced for one grating stage to be offset from the phase of the other grating stage. This grating design permits the determination of a more significant portion of a measurement of grating position to be obtained by measuring the number of complete cycles through which the Moire fringe signal provided by one grating stage changes. The Moire fringe pattern varies through one cycle whenever the grating is moved a distance equal to the thickness of two adjacent interference planes along a direction perpendicular to those planes. A less significant portion of the measurement of grating position, or in other words a measurement of grating displacement smaller than one complete cycle, is obtained by determining the phase or relative values of the Moire frings signals provided by each of the two grating stages. Because the lines of one grating stage are offset from the other, the phase of the signal produced by one grating stage will be offset from the other. This phase offset causes the two signals to provide a unique combination of values for each position within a cycle. Measuring apparatus responsive to the combination of the two signal values, therefore, provides an output precisely identifying grating position within a cycle.

BRIEF DESCRIPTION OF THE DRAWINGS

Further objects, features, and advantages of the invention defined by the appended claims will become apparent from a consideration of the following description and accompanying drawings in which:

FIG. 1 is a perspective, schematic view of a surface flatness measuring apparatus embodying the interferometric position measuring apparatus of this invention;

FIG. 2 is a plan view of the optical grating illustrated in FIG. 1; and

FIG. 3 is a perspective, schematic view of apparatus for measuring the displacement of a lathe cutting tool from a predetermined plane as that tool moves along a workpiece.

DETAILED DESCRIPTION OF THE PREFERRED EMBODIMENTS

FIG. 1 illustrates a surface flatness measuring device 10 that includes apparatus 12 for providing a planar interference pattern 14 and a grating 16 mounted on a probe 18 adapted to be moved across a surface 19 to be measured. The grating 16 intercepts the interference pattern 14 as the probe is moved across the surface being measured. Movement of the probe 18 over surface elevations and depressions causes the grating 16 to be moved through the interference pattern 14 along the dimension of the Y-axis of the measuring device 10. This relative movement between planar interference pattern 14 and grating 16 provides a varying Moire fringe pattern that is sensed and measured by electronic apparatus 20. Apparatus 20 provides an output indicating the height of elevations and depressions on the surface being measured.

The apparatus 12 for providing the planar interference pattern 14 comprises a frame 21 which holds a laser source 22 for providing a beam of laser light, and an objective lens 24 for focusing the laser light produced by the laser source 22 at a pin hole aperture 26. An aberration-free collimating lens 28 is positioned to receive laser light from the pin hole aperture 26 and provide a collimated beam 30 of laser light. Two prisms 32 and 34 are disposed in the beam 30 to receive different portions of that beam. Prisms 32 and 34 bend the portions of the beam 30 received by those two prisms so that the received beam portions intersect and interfere to provide the interference pattern 14. Light from the prisms 32 and 34 would create an interference pattern comprising a plurality of alternate light and dark lines if the light from those prisms were projected onto a surface such as a display screen. However, light from these prisms is not projected onto a surface but is instead allowed to propagate in the direction along which a measurement of surface profile is to be made. Interference pattern 14, therefore, comprises a plurality of light interference planes 36 and alternate dark interference planes 38. The light interference planes 36 are formed from the positive addition of light from prism 32 and light from prism 34. The dark planes 38 separating the light plane 36 are formed by the negative addition or cancellation of light from prism 32 and light from prism 34. The collimating lens 28 and prisms 32 and 34 are of sufficiently high quality so that the interference planes are adjacent each other and are of equal thickness.

As stated previously, motion of the grating 16 in a direction perpendicular to planes 36 and 38 provides a Moire fringe pattern which is detected and measured by the electronic apparatus 20. Grating 16 (FIG. 2) is designed to provide two different Moire fringe pattern signals to precisely identify grating position. The grating 16 comprises a first stage 40 of alternate transparent and opaque lines 42 and 44, respectively, and a second stage 46 comprising a plurality of transparent and opaque lines 48 and 50, respectively. The stages 40 and 46 are placed side-by-side so that they intercept different portions of the pattern 14. The optical interference pattern 14 striking each stage of the grating 16 is intercepted by that stage to produce a Moire fringe pattern as the grating is moved along a dimension perpendicular to the planes forming the pattern 14. Each Moire fringe pattern varies through one complete cycle in response to movement of the grating 16 a distance along the Y-axis of device 10 equal to the thickness of two planes, that is one dark and one light interference plane. The transparent and opaque lines 42 and 44 of stage 40 are offset from the transparent and opaque lines 48 and 50 of stage 46 by an amount such that the phase of the Moire fringe signal pattern produced by stage 40 is offset from the phase of the Moire fringe signal pattern produced by stage 46 by 90°. This 90° phase offset causes the two Moire fringe signals to provide a unique combination of signal values for each position within one cycle. That is, because of this phase offset, although one Moire fringe signal may have the same value at more than one position within a cycle, the other Moire fringe signal will have different values at each of the positions at which the first signal has the same value. The combination of signal values of the two signals, therefore, uniquely identify grating position within a cycle.

The apparatus 20 for determining grating position and providing an output indicating that position includes two electro-optic detectors 52 and 54 for detecting the optic Moire fringe patterns produced by grating stages 40 and 46, respectively, and for converting those sensed optic patterns to electronic signal patterns. The electronic signal patterns from detectors 52 and 54 are amplified by amplifiers 56 and 58, respectively. The amplified electronic signals are transmitted to a pulse generator or pulse generating circuit 60. Pulse generator 60 is simply a null detector that provides an output pulse upon detection of a null signal and thus indicates grating displacement in units equal to the thickness of one pair of interference planes, one light plane 36 plus one dark plane 38, or in other words the distance that grating 16 must be moved to cause the Moire fringe signals to vary through one complete cycle. The output signals from pulse generator 60 are transmitted to a converting and display counter 62 which converts received signals indicating grating displacements to a measurement expressed in standard measuring units such as microinches or millimeters, and provides an output display of that measurement.

The signals from amplifiers 56 and 58 are also transmitted to a fractional fringe detector 64. Detector 64 determines the phase of the signals from amplifiers 56 and 58, or in other words determines the relative values of those signals, and provides an output to display apparatus 62 along line 66 that identifies grating position within a cycle. Since the signals provided by amplifiers 56 and 58 have a unique or different combination of values for each different position within one cycle, detector 54 precisely determines the position of the grating within a cycle by comparing the relative values of the two received signals to each other. Display apparatus 62 combines signals from pulse generator 60 and from fractional fringe detector 64 to provide an output display that is an extremely accurate measurement of grating position.

The conversion of signals representing grating position as a function of the spacing between the interference planes, or in other words the width of those planes to a representation of grating position in standard measuring units such as microinches or millimeters is relatively uncomplicated because of the width of the individual interference planes of pattern 14 can be adjusted to have a value for which the conversion from one system to the other is very straightforward and uncomplicated. The width of the interference planes of the pattern 14 is determined by the shape of the prisms 32 and 34 and by the orientation of those two prisms with respect to each other. The orientation of the prisms 32 and 34, or in other words the angle 69 between those prisms, can be readily adjusted because the prisms are each held in a groove 70 (shown only for prism 34) so that the angle 69 can be changed simply by moving slidable bar 71 attached to the ends of the prisms opposite grooves 70. The width or thickness of the interference planes 36 and 38 is increased by decreasing angle 69 between prisms 32 and 34, and is decreased by increasing that angle. The prisms 32 and 34 are positioned so that interference planes 36 and 38 have a thickness that can be readily converted to measurements expressed in common measuring units. For example, if the interference planes are provided with a thickness of 50 microinches, the Moire fringe pattern produced for the two grating stages 40 and 46 will oscillate through one complete cycle in response to a grating displacement of 100 microinches. A measurement of grating displacement in microinches can thus be provided simply by dividing measurements indicating the number of cycles through which a Moire fringe pattern has oscillated by a factor of 100. It is a relatively simple matter to make this division. That is, less complicated electronic apparatus is required to divide received signals by a factor of 100 than is required to divide those signals by factors say of 95 or 105.

In operation, the flatness of a nominally flat or planar surface is measured by positioning apparatus 12 so that the planar interference pattern 14 is positioned parallel to and somewhat above the surface to be measured. The dimensions of these planes forming the interference 14 is relatively independent of the orientation of laser source 22 with respect to prisms 32 and 34. Thus, only a minimum preliminary orientation of the various elements of the apparatus 12 is required before measurements can be made. The height and direction along which the planar interference pattern 14 is projected is selected so that grating 16 intercepts pattern 14 as probe 18 is moved across the surface being measured. As the probe 18 moves over surface elevations and depressions, grating 16 is displaced in the positive and negative Y-directions, respectively, through pattern 14. A Moire fringe pattern which oscillates through one complete cycle in response to a movement of the grating 16 along this dimension by an amount equal to the spacing between the centers of like interference planes is produced for each of the grating stages 40 and 46. The optical Moire fringe pattern signals are detected and converted to electric signals by the electronic measuring and detecting apparatus 20. The electronic apparatus 20 processes these electrical signals and provides an output display indicating displacement of the grating 16 in a direction perpendicular to the planes 36 and 38. This output display represents surface elevations and depressions.

If it is desired to measure flatness along a second dimension across the test surface, the apparatus 20 is simply repositioned so that the planar interference pattern 14 projects along that dimension. If it is desired to determine the accuracy of measurements being made to insure that no optical component of the apparatus 12 for providing the planar interference pattern 14 is defective or distorted and causing inaccurate measurements to be made, a first measurement of elevation is made along a predetermined dimension with the apparatus 12 arranged as illustrated in FIG. 1. A second measurement is then made along the same dimension with the apparatus 12 for providing the planar interference pattern 14 being inverted so that prism 32 occupies the position of prism 34 in FIG. 1, and prism 34 occupies the position of prism 32 in FIG. 1. If the measurements obtained with the planar interference pattern providing apparatus 12 being inverted are identical to those obtained prior to the inversion of the apparatus 12, it is known that there are no distortions in the planar interference pattern 14 and that the measurements obtained are accurate.

FIG. 3 illustrates a signal generating apparatus 72 for providing signals indicating the displacement of a cutting tool 74 of a lathe 76. The cutting tool 74 is moved by the lathe along a workpiece 78. The signal generating apparatus 72 provides signals indicating the magnitude and direction of any displacement of the cutting tool 74 along a dimension perpendicular to the workpiece 78. A signal indicating displacement along this perpendicular dimension notified an operator that the cutting tool 74 has moved and is no longer cutting along a predetermined line. An operator seeing such a signal will adjust lathe 76 to return the cutting tool 74 to the predetermined line.

The apparatus 72 for indicating the displacement of cutting tool 74 includes the apparatus 12 for providing a planar interference pattern, and the electronic signal detecting and measuring apparatus 20 illustrated in FIG. 1. The apparatus 12 for providing a planar interference pattern is independent of and spaced from the lathe 76 to prevent an vibrations of lathe 76 from distorting the interference pattern. Grating 16 is mounted on a tool-holding platform 80 of the lathe 76. Cutting tool 74 is fixedly attached to the platform 80 by a tool-post 82. The position of cutting tool 74 and grating 16 are thus fixed with respect to each other so that the grating 16 will undergo the same motion as cutting tool 74. The prisms 32 and 34 for providing a planar interference pattern, and grating 16 is oriented to provide Moire fringe patterns indicating displacement of grating 16 toward and away from workpiece 78. The Moire fringe pattern signal is detected and measured by the apparatus 20 illustrated in FIG. 1 and described previously. Apparatus 20 provides an output that indicates any displacement between grating 16 and apparatus 12 along the Y-axis of lathe 76, and therefore, also indicates any displacement of cutting tool 74 perpendicular to the surface of workpiece 78.

The signal generating apparatus 72 for indicating the position of cutting tool 74 also includes apparatus for detecting any movement of the entire lathe 76 with respect to the apparatus 12 for providing a planar interference pattern. This apparatus comprises two prisms 84 and 86 which are similar to the prisms 32 and 34. Prisms 84 and 86 are positioned to intercept a portion of laser beam 30 that is separate from the portion of that beam intercepted by prisms 32 and 34, and to provide a second planar interference pattern directed to intercept a grating 88 mounted on the lathe 76. Any relative motion between lathe 76 and apparatus 12 along the illustrated Y-axis causes grating 88 to provide a change in the Moire fringe pattern. This pattern change is detected and measured by electronic apparatus 90 that is identical to the detecting measuring apparatus 20 described previously. The electronic apparatus 90 provides an output that indicates relative displacement between the apparatus 12 and lathe 76 and thus prevents the operator from mistaking relative motion between these two apparatuses, caused for example by the vibration of the lathe 76, from a movement of the cutting tool 74 with respect to the lathe 76 and workpiece 78. That is, it is known that a relative motion has occurred between the apparatus 12 and lathe 76, and that no displacement of cutting tool 74 with respect to lathe 76 and workpiece 78 has occurred when both electronic apparatuses 20 and 90 provide outputs indicating identical displacements. Similarly, it is known that the cutting tool 74 has been moved with respect to the lathe 76 when apparatus 20 provides an output indicating a displacement that is different from the output provided by apparatus 90.

In operation, the apparatus 12 for providing a planar interference pattern, and the gratings 16 and 88 are positioned so that both the interference planes and the lines of the gratings are disposed substantially perpendicular to the dimension along which displacement is to be measured. The cutting tool 74 is then placed in a predetermined position, and operation of the lathe 76 is begun. The signal generating apparatus will not produce any output signals in response to displacement of the cutting tool along the length of workpiece 78, or in other words, along the X-axis of FIG. 3. However, any relative displacement along the illustrated Y-axis between the apparatus 12 and either grating 16 or grating 88 will cause those gratings to provide a Moire fringe pattern. Apparatuses 20 and 90, respectively, detect and process those patterns and provide outputs indicating the direction and magnitude of such displacements. It is known that the cutting tool 74 had been moved toward or away from the surface of workpiece 78, when the apparatus 20 provides an output indicating grating 16 has been displaced, and when apparatus 90 does not provide an output indicating an identical displacement. Upon receipt of such a signal, an operator will move platform 80 to return cutting tool 74 to the predetermined position along the illustrated Y-axis. Since the apparatus 20 continually provides an output indicating the position of grating 16, an operator can return cutting tool 74 to the predetermined position along the Y-axis simply by moving platform 80 until apparatus 20 provides an output signal having a predetermined relationship with respect to the output signal provided by apparatus 90. Or, the illustrated, hand-operated, lathe 76 could be modified to include a feedback system and automatic control apparatus responsive to the output signal from apparatuses 20 and 90 for automatically maintaining cutting tool 74 at a predetermined position along the illustrated Y-axis.

Having thus described several embodiments of this invention, a number of modifications will occur to those skilled in the art. Therefore, what is claimed is:

1. A method of checking for the presence of inherent inaccuracies in a system for making surface profile measurements along a surface comprising the steps of:
   projecting an interference pattern parallel to said surface, said pattern being spaced at a predetermined distance from said surface;
   positioning a grating means to intercept said interference pattern and produce a Moire fringe pattern;
   providing a relative motion between said interference pattern and said grating means indicative of variations of said surface as a probe is moved along said surface, said relative motion producing variations in said Moire fringe pattern;
   measuring said Moire fringe pattern variations to determine the magnitude of said surface variations;
   inverting said interference pattern;
   providing a second relative motion between said interference pattern and said grating means identical to said relative motion to obtain second variations in said Moire fringe pattern;
   measuring said second variations in said Moire fringe pattern; and
   comparing said measured fringe pattern variations and said second measured fringe pattern variations, the absence of differences in said measurements being indicative of the absence of inherent inaccuracies in said system.

2. The method of claim 1 in which:
   said step of projecting an interference pattern comprises projecting a beam of coherent wave energy parallel to and spaced a distance from said surface, and positioning two identical deflecting means to receive different portions of said beam and deflect said received portions to intersect and provide a planar interference pattern, the planes of said pattern being of equal thickness;

said step of positioning a grating means comprises mounting a grating means having alternate transparent and opaque lines on a probe so that said lines are substantially parallel to said interference planes of said planar interference pattern and intercept said interference pattern;

said step of providing a relative motion comprises moving said probe across said surface along a predetermined path, movement of said probe over surface elevations and depressions causing said grating to be moved perpendicular to said planes of said interference pattern to provide variations in said Moire fringe pattern; and said step of providing a second relative motion also comprises moving said probe across said surface along said predetermined path.

* * * * *